US008681732B2

(12) United States Patent
Park et al.

(10) Patent No.: US 8,681,732 B2
(45) Date of Patent: Mar. 25, 2014

(54) METHOD OF CHANGING FREQUENCY ASSIGNMENT STATUS IN BROADBAND WIRELESS ACCESS SYSTEM

(75) Inventors: Chul Park, Daejeon (KR); Kwang Jae Lim, Daejeon (KR); Hyun Lee, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 312 days.

(21) Appl. No.: 12/808,493

(22) PCT Filed: Oct. 14, 2008

(86) PCT No.: PCT/KR2008/006048
§ 371 (c)(1),
(2), (4) Date: Jun. 16, 2010

(87) PCT Pub. No.: WO2009/078569
PCT Pub. Date: Jun. 25, 2009

(65) Prior Publication Data
US 2010/0271941 A1    Oct. 28, 2010

(30) Foreign Application Priority Data
Dec. 18, 2007   (KR) .......................... 10-2007-0133666

(51) Int. Cl.
*H04W 4/00*    (2009.01)
(52) U.S. Cl.
USPC ........... 370/330; 370/328; 370/329; 370/437; 370/468; 455/452.1
(58) Field of Classification Search
None
See application file for complete search history.

(56) References Cited

U.S. PATENT DOCUMENTS 7,068,623 B1 * 6/2006 Barany et al. ................. 370/329
7,145,890 B1 * 12/2006 Seo et al. ...................... 370/331
(Continued)

FOREIGN PATENT DOCUMENTS

KR  10-2004-0046846 A   6/2004
KR  10-2005-0017560 A   2/2005
(Continued)

OTHER PUBLICATIONS

IEEE Standard 802.16/2004, IEEE Standard for Local and metropolitan area networks—Part 16: Air Interface for Fixed Broadband Wireless Access Systems, 2004.

(Continued)

*Primary Examiner* — Donald Mills
(74) *Attorney, Agent, or Firm* — Jefferson IP Law, LLP (57) ABSTRACT

The present invention relates to a method of changing a frequency assignment (FA) status in an improved broadband wireless access system where terminals and base stations communicate with each other by using a plurality of FAs. The base station changes the status of one of secondary FA into the status of the pFA in order to adjust a load of the primary FA, and communicates with the terminal through the pFA of which status is changed. When a response is received from the terminal, the base station changes the status of the pFA and communicates with the pFA of the terminal through a new pFA. The status of a previous pFA between the base station and the terminal is changed into the status of the sFA, and a previous sFA is changed into the pFA, so that communication is performed through new FAs.

19 Claims, 8 Drawing Sheets

(56) References Cited

U.S. PATENT DOCUMENTS

| | | | |
|---|---|---|---|
| 8,027,682 B2* | 9/2011 | Kang et al. | 455/436 |
| 8,149,777 B2* | 4/2012 | Kang et al. | 370/329 |
| 8,279,767 B2* | 10/2012 | Kang et al. | 370/252 |
| 2005/0197133 A1* | 9/2005 | Hong et al. | 455/450 |
| 2005/0265223 A1* | 12/2005 | Song | 370/208 |
| 2009/0161610 A1* | 6/2009 | Kang et al. | 370/329 |
| 2009/0296835 A1 | 12/2009 | Hidaka | |
| 2010/0040011 A1* | 2/2010 | Kang et al. | 370/329 |
| 2010/0177645 A1* | 7/2010 | Kang et al. | 370/252 |

FOREIGN PATENT DOCUMENTS

| | | | |
|---|---|---|---|
| WO | 2007/072930 A1 | 6/2007 | |
| WO | WO 2007078102 A1 * | 7/2007 | |

OTHER PUBLICATIONS

IEEE Standard 802.16e-2005, IEEE Standard for Local and metropolitan area networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1, IEEE Computer Society and the IEEE Microwave Theory and Techniques Society, Feb. 28, 2006.

IEEE Project P802.16/2004/Cor2/D3, Draft Standard for Local and metropolitan area networks—Part 16: Air Interface for Fixed and Mobile Broadband Wireless Access Systems Corrigendum 2, LAN/MAN Standards Committee and the IEEE Microwave Theory and Techniques Society, Mar. 28, 2007.

* cited by examiner

METHOD OF CHANGING FREQUENCY ASSIGNMENT STATUS IN BROADBAND WIRELESS ACCESS SYSTEM

TECHNICAL FIELD

The present invention relates to a method of changing a frequency assignment (FA) status in a broadband wireless access system. Particularly, the present invention relates to a method of changing an FA status in a base station of a broadband wireless access system that supports frequency overlay.

BACKGROUND ART

A broadband wireless access system is a system that defines a terminal MS, a base station BS, and a router ACR so as to be compatible with an existing public IP network, and provides a technique that makes a terminal have mobility, thereby allowing an IP-based network service to be used while the terminal is moved. An existing broadband wireless access system provides a structure where one terminal can communicate with a base station through only a band belonging to one FA.

Meanwhile, as a developed existing broadband wireless access system, there has been developed a broadband wireless access system where one terminal can communicate with a base station through a plurality of FAs. Herein, a function for the terminal to communicate with the base station by using a plurality of FAs is referred to as a frequency overlay function. According to the developed broadband wireless access system (hereinafter referred to as a "frequency overlay communication system"), the structure where a base station is connected to a public IP network is the same as an existing broadband wireless access system (hereinafter referred to as a "non-frequency overlay communication system"), and a wireless access portion between the base station and the terminal is different from a non-frequency overlay communication system. That is, the difference is as follows: the base station and the terminal communicate with each other through a plurality of frequency bandwidths that have access by using two or more FAs. Merits of the frequency overlay communication system having the above-mentioned characteristics are as follows: the frequency overlay communication system can use a band N times as large as a band of a non-frequency overlay communication system by slightly changing a wireless access method between a terminal and a base station, and a function of a MAC layer related thereto, e.g., it is possible to use a band twice as large under the assumption that one terminal uses two FAs. In conclusion, an available band is increased in proportion to the number of FAs used by the terminal. For this reason, it is possible to increase transmission speed between the terminal and the base station by two times or more (in general, when the number of FAs used between the terminal and the base station is N, transmission speed is increased by N times as compared to a non-frequency overlay communication system that uses one FA).

In this frequency overlay communication system, a large load is generated in a specific FA used by the base station while a base station and a terminal communicate with each other by using a plurality of FAs. For this reason, the use efficiency of the base station may considerably deteriorate. The base station communicates with the terminal by using a plurality of FAs. However, substantially, most of various control signals are transmitted through one FA (a primary FA, hereinafter referred to as a "pFA") specified from the plurality of FAs, and data traffic is also transmitted. Therefore, when one FA of the plurality of FAs used by the base station communicates with a plurality of terminals and operates as a plurality of pFAs, a case where a load is concentrated on the FA occurs.

When pFAs of a plurality of FAs used for communication between the base station and the terminal are set in a frequency overlay communication system in the related art, the pFAs cannot be changed until the communication is completed. Therefore, the above-mentioned problem occurs.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of changing a frequency assignment (FA) status that can change a pFA into one FA selected from sFAs in use while a base station performs communication by using terminals and a plurality of FAs in a frequency overlay communication system.

Technical Solution

An exemplary embodiment of the present invention provides a method of changing an FA status in a base station of a broadband wireless access system. The method includes a) deciding an FA of which status is to be changed, b) transmitting a status change request of the decided FA to a terminal, c) receiving a completion response of the status change request of the FA from the terminal, and d) communicating with the terminal through the FA of which status is completely changed.

Another embodiment of the present invention provides a method of changing an FA status in a terminal of a broadband wireless access system. The method includes a) receiving a status change request of an FA from a base station, b) confirming an FA of which status is to be changed in the base station, c) changing the status of the FA, d) transmitting a response that represents the completion of the change of the FA to the base station, and e) communicating with the FA of which status is completely changed of the base station.

Advantageous Effects

According to the present invention, since the base station can change the status of a specific terminal and FAs in use according to need, it is possible to adjust loads between the FAs.

Further, the base station can easily change the statuses of a specific terminal and FAs in use through a MAP IE that is broadcasting information.

Furthermore, the base station can change the statuses of the FAs in use while continuously maintaining the access of a specific terminal.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprise" and/or "comprising" when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation and can be implemented by hardware components or software components, and combinations thereof.

In this specification, a terminal may indicate a mobile station (MS), a mobile terminal (MT), a subscriber station (SS), a portable subscriber station (PSS), a user equipment (UE), an access terminal (AT), and the like. Further, the terminal may have the entire or partial function of the mobile station, the mobile terminal, the subscriber station, the portable subscriber station, the user equipment, the access terminal, and the like.

In this specification, a base station (BS) may indicate an access point (AP), a radio access station (RAS), a node B, a base transceiver station (BTS), a mobile multihop relay base station (MMR-BS), and the like. Further, the base station may have the entire or partial function of the access point, the radio access station, the node B, the base transceiver station, the MMR-BS, and the like.

A method of changing an FA status in a frequency overlay communication system according to an exemplary embodiment of the present invention will be described in detail below with reference to the accompanying drawings.

Figure 1:
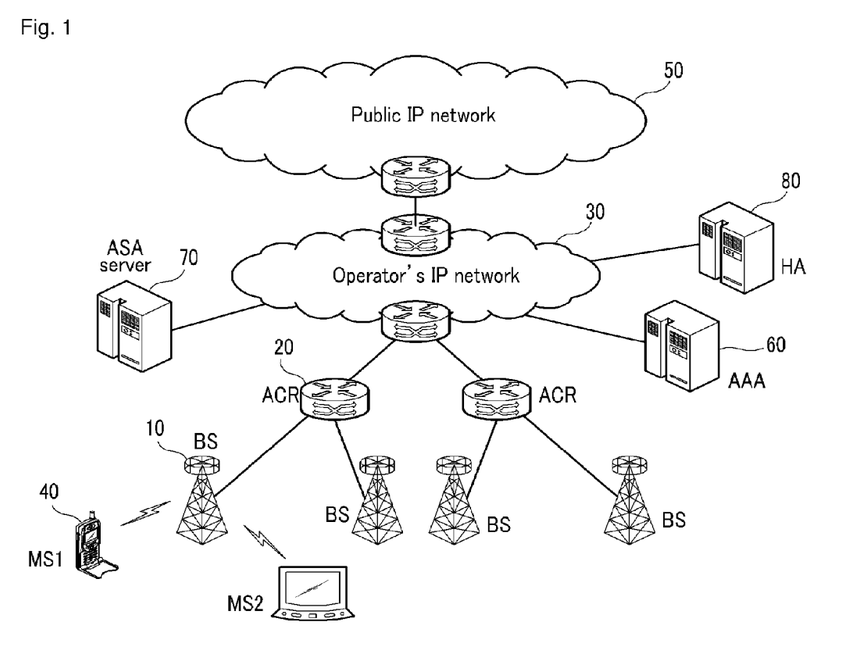
FIG. 1 is a view schematically showing a general non-frequency overlay communication system.

FIG. 1 is a view schematically showing a general non-frequency overlay communication system.

As shown in FIG. 1, in a non-frequency overlay communication system, a base station (BS) 10 is connected to a specific operator's IP network 30 through a router (ACR) 20. Accordingly, a subscriber should have access to a public IP network 50 through the base station 10, the router 20, and the operator's IP network 30 in order to use an IP-based service through the terminal 40.

Further, an AAA server 60, an ASA server 70, a HA server 80, and the like are provided in the operator's IP network 30. The AAA server 60 and the ASA server 70 perform a function of authenticating a subscriber, who intends to have access to the non-frequency overlay communication system by using the terminal 40, and storing QoS information. The HA server 80 performs a home agent function with respect to the terminal 40.

In the non-frequency overlay communication system, the terminal 40 can use an IP-based network service through the base station 10, the router 20, and the operator's IP network 30 even while moving. However, in the non-frequency overlay communication system, the terminal 40 can communicate with the base station 10 through only one FA.

In order to solve the above-mentioned drawback, there has been disclosed a frequency overlay communication system for performing a frequency overlay function that allows the terminal and the base station to communicate with each other through a plurality of FAs. The configuration between the base station 10 and the public IP network 50 of the frequency overlay communication system is the same as that of the non-frequency overlay communication system in the related art, but the configuration between the base station 10 and the terminal 40 of the frequency overlay communication system is different from that of the non-frequency overlay communication system in the related art. Only the difference between the systems will be described herein.

Figure 2:
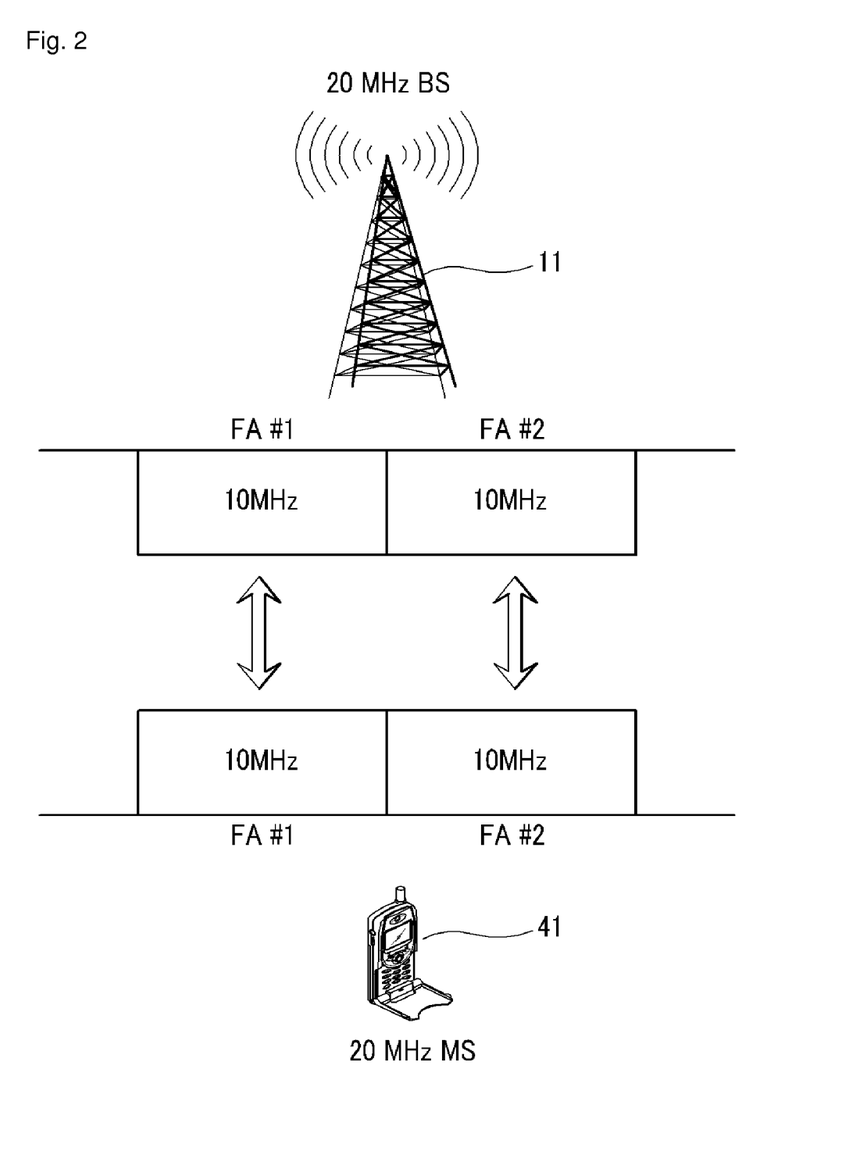
FIG. 2 is a view schematically illustrating a wireless access method between a terminal and a base station of a general frequency overlay communication system.

FIG. 2 is a view schematically illustrating a wireless access method between a terminal and a base station of a general frequency overlay communication system.

As shown in FIG. 2, the base station 11 of the frequency overlay communication system can communicate with a frequency overlayable terminal 41, which can perform a frequency overlay function, through a plurality of FAs.

As described above, in the frequency overlay communication system, the base station 11 and the terminal 41 can communicate with each other through the plurality of FAs. However, in FIG. 2, it is assumed that only two FAs FA#1 and FA#2 are used for communication for better comprehension and ease of description.

Referring to FIG. 2, the terminal 41 can communicate with the base station 11 by using two FAs FA#1 and FA#2. That is, the terminal 41 can communicate with the base station 11 in each of one band of 10 MHz of the FA FA#1 and another band of 10 MHz of the FA FA#2.

Accordingly, in this case, the terminal 41 may use a band that is twice as wide as the band of the terminal 40 of the non-frequency overlay communication system shown in FIG. 1. For this reason, the transmission speed between the terminal 41 and the base station 10 is increased about twice as high as the terminal of the non-frequency overlay communication system.

Meanwhile, in the frequency overlay communication system, the base station and the terminal can communicate with each other by using a plurality of FAs. One of the FAs used in this case is defined as a primary frequency assignment (pFA), and the others are defined as secondary frequency assignment (sFAs). Accordingly, only one pFA and one or more sFAs may exist between a specific terminal and a specific base station in the frequency overlay communication system. Herein, the pFA is an FA that is used to mainly transmit most of the important control signals between the base station and the terminal and to transmit data traffic between the base station and the terminal. In contrast, the sFA is an FA that is used to mainly transmit data traffic, and is transmitted at very low frequency when transmitting a control signal, as compared to the pFA. Further, unless the connection using a pFA is set and maintained between the base station and the terminal, the base station does not have access to the terminal. However, even though the connection using an sFA is released, the terminal has access to the base station for the purpose of communication therebetween if the connection using a pFA is maintained. As described above, a plurality of FAs exists in the same base station in the frequency overlay communication system. The FAs are classified into the pFA and the sFA, but functions and meanings thereof are different as described above. Particularly, the pFA is very important in the communication between the base station and the terminal.

Referring to FIG. 2, the base station 11 and the terminal 41 communicate with each other through two FAs in total, the FA#1 is set as a pFA, and the FA#2 is set as an sFA. Since the FA#1 is a pFA, the connection between the base station 11 and the terminal 41 is released if the FA#1 is disconnected. However, since the FA#2 is an sFA, the connection between the base station 11 and the terminal 41 may be maintained if the connection using the FA#1 is maintained even though the FA#2 is disconnected.

Figure 3:
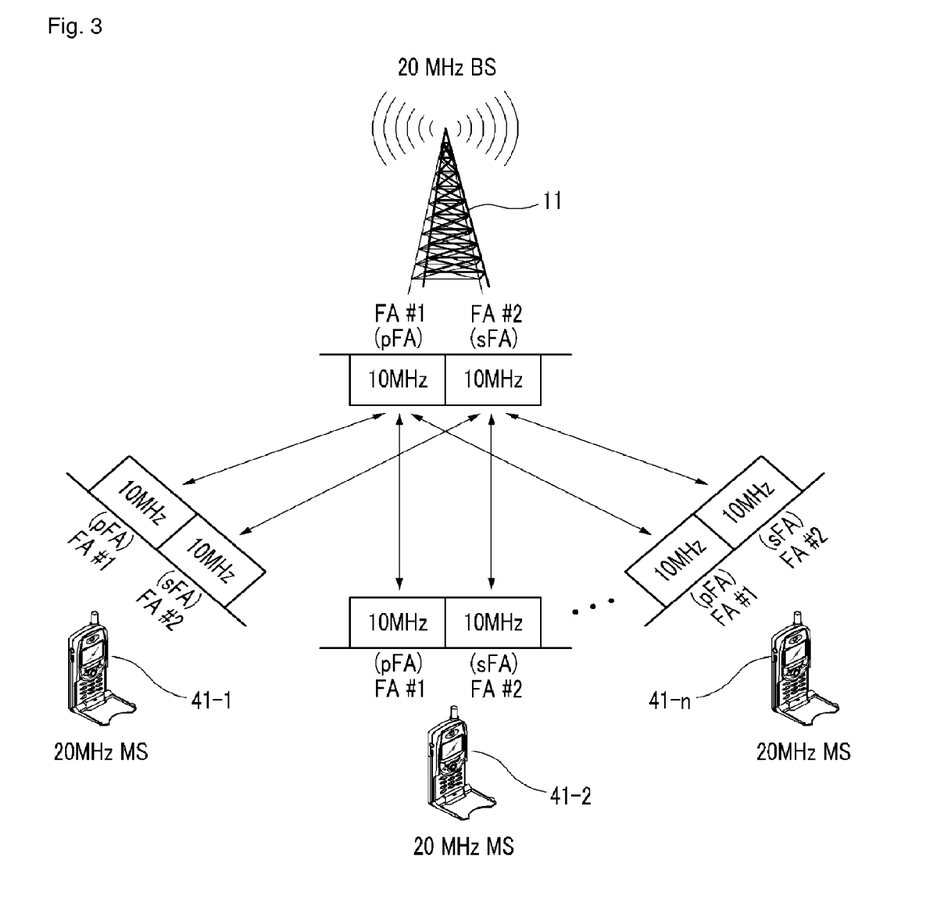
FIG. 3 is a view showing that a load is generated at a pFA of the base station of the general frequency overlay communication system.

Meanwhile, referring to FIG. 3, n terminals 41-1, 41-2, ..., 41-n have access to the base station 11. Further, the FA#1 and the FA#2 of the base station 11 have access to two FAs of each of the n terminals 41-1, 41-2, ..., 41-n, respectively. Meanwhile, the FA#1 of the base station 11 operates as a pFA with respect to all of the n terminals 41-1, 41-2, ..., 41-n (which is unusual but is assumed to clarify the problem in the related art), and the FA#2 operates as an sFA.

In this case, a large load is applied to the FA#1 of the base station 11 as a pFA, so that the operational efficiency of the entire base station 11 may deteriorate. Therefore, the base station 11 should control a load so that the load applied to the FA#1 is decreased. However, in the frequency overlay communication system in the related art, while having access to terminals belonging thereto, the base station 11 cannot control the load applied to the FA#1.

Therefore, according to an exemplary embodiment of the present invention, in order to solve this problem, the load applied to the pFA can be adjusted by adjusting the number of terminals having access to the pFA of the base station. Particularly, according to the exemplary embodiment of the present invention, while the pFA, which is used to communicate with the terminal by the base station, has access to the terminal, the pFA can be changed, so that the number of terminals is adjusted. As a result, it is possible to adjust the load applied to the pFA.

Basically, the base station communicates with the terminals by a plurality of FAs in the frequency overlay communication system. Since one FA is used as a pFA and the other FA is used as an sFA in this case, the FA having been used as the sFA is changed into a new pFA and the FA having been used as the pFA is changed into a new sFA in the exemplary embodiment of the present invention. For this purpose, the base station requests the terminal, where the pFA should be changed, to change the pFA, and the terminal permits the pFA change request from the base station in order to change the pFA. Therefore, the change of the pFA is completed.

Figure 4:
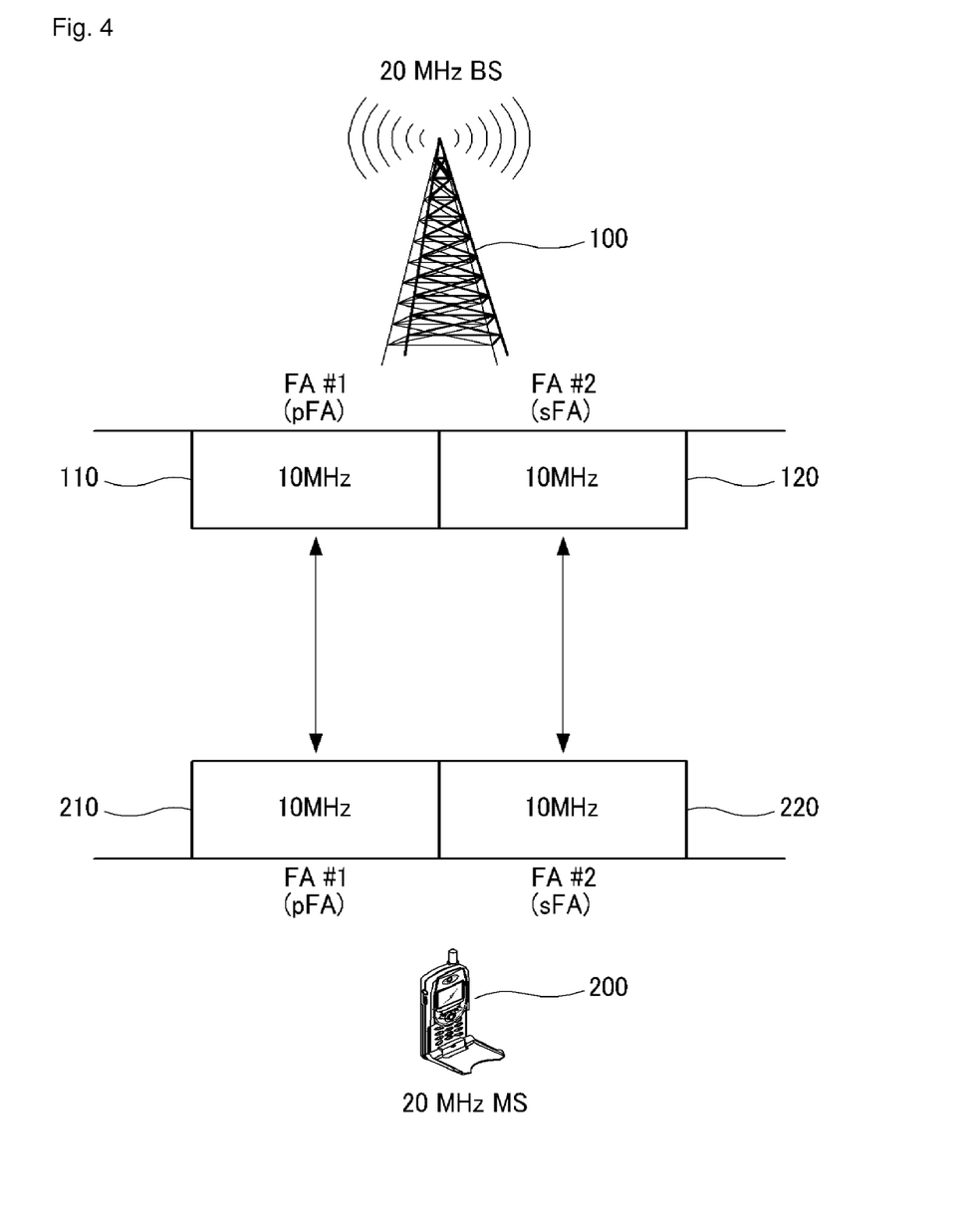
FIG. 4 is a view schematically illustrating a method of changing an pFA according to an exemplary embodiment of the present invention, where the pFA is not changed.
Figure 5:
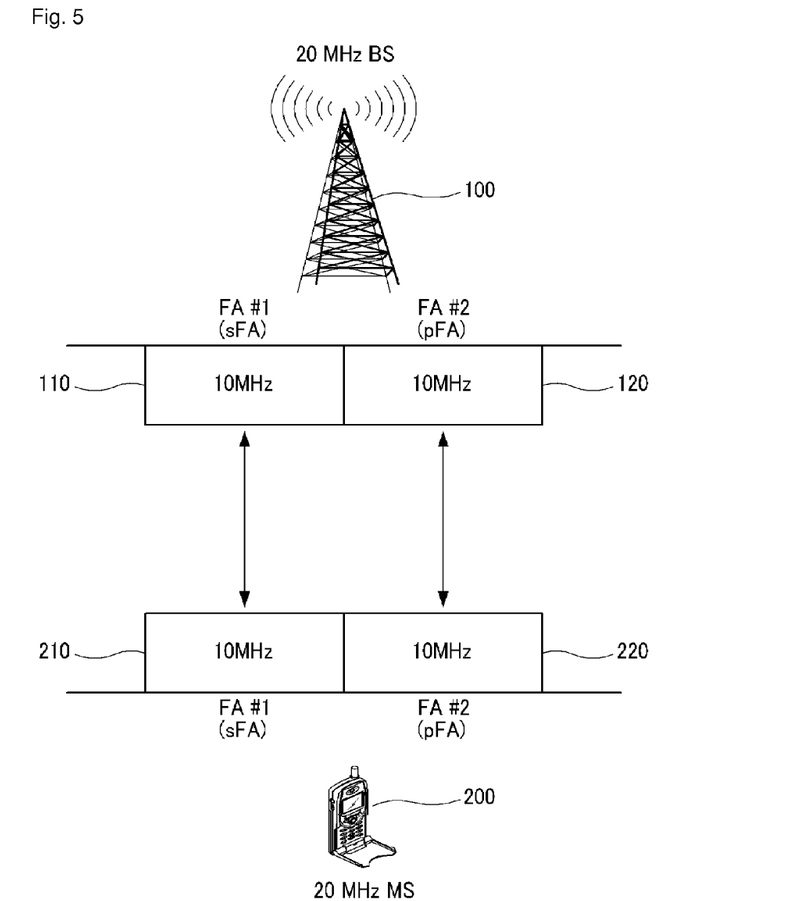
FIG. 5 is a view schematically illustrating the method of changing the pFA according to the exemplary embodiment of the present invention, where the pFA has been changed.

FIG. 4 is a view schematically illustrating a method of changing a pFA according to an exemplary embodiment of the present invention, where the pFA is not changed, and FIG. 5 shows a view schematically illustrating the method of changing the pFA according to the exemplary embodiment of the present invention, where the pFA has been changed.

As shown in FIG. 4, a base station 100 and a terminal 200 communicate with each other through two FAs. Between the two FAs used for communication, an FA#1 110 of the base station 100 and an FA#1 210 of the terminal 200 are pFAs, and an FA#2 120 of the base station 100 and an FA#2 220 of the terminal 200 are sFAs.

In this status, if the base station 100 requests a terminal 200 to change a pFA in order to adjust the load of the FA#1 110 that is the pFA of the base station 100 and the terminal 200 then completes the change of the pFA in response to this request, the FA#1 that is the existing pFA of the base station 100 is changed into an sFA and the FA#2 that is the existing sFA is changed into a pFA. FIG. 5 shows that the pFA has been changed between the base station 100 and terminal 200 as described above.

Referring to FIG. 5, the base station 100 and the terminal 200 still communicate with each other through two FAs. However, as for two FAs used for communication, the FA#2 120 of the base station 100 and the FA#2 220 of the terminal 200 are pFAs, and the FA#1 120 of the base station 100 and the FA#1 210 of the terminal 200 are sFAs, which means that a status has been changed from the previous status. Therefore, after the change, the FA#2 120 that is a pFA of the base station 100 has access to and communicates with the FA#2 220 that is a pFA of the terminal 100. Further, the FA#1 110 that is an sFA of the base station 100 has access to and communicates with the FA#1 210 that is an sFA of the terminal 200.

Accordingly, the FA#1 110, which has operated as a pFA on the side of base station 100 before the change of the pFA, operates as an sFA on the side of the base station 100 after the change of the pFA. For this reason, the load of the FA#1 110 of the base station 100 is decreased. Therefore, as described above, the load can be adjusted in the base station 100 through the change of the pFA between the base station 100 and the terminal 200.

According to the embodiment of the present invention, due to the pFA load adjustment in the base station as described above, the base station requests the terminal to change the pFA in order to change the FA status. In this case, the change of the pFA may be requested in various ways, and an information element (IE) (hereinafter referred to as a "MAP IE"), which is included in a MAP transmitted to the terminal by the base station, is used in the exemplary embodiment of the present invention. In this case, the base station may make the contents of the pFA change request be included in the MAP IE, which has been used for other purposes, and may then request the terminal to change the pFA. Alternatively, the base station may form a new MAP IE, which requests the pFA change, and may request the terminal to change the pFA. The above-mentioned two methods may be used in the exemplary embodiment of the present invention.

First, it will be described that the contents of the pFA change request is included in the existing MAP IE. In the exemplary embodiment of the present invention, the contents of the pFA change request may be included in a reserved region of the existing MAP IE. In the exemplary embodiment of the present invention, an anchor base station switch information element (hereinafter referred to as an "Anchor_BS_switch IE"), which is a MAP IE included in an UL MAP transmitted to the terminal by the base station, is used in order to perform the high-speed switching of the existing base station.

The Anchor_BS_switch IE includes an action code representing an operation that is requested by the base station and should be performed by the terminal. The action code has the total size of 2 bits. If the value of the terminal is "00", the terminal should perform high-speed switching to a target base station in a switch range that is included in a downlink channel descriptor message. If the value of the terminal is "01", the terminal should perform high-speed switching to a target base station at an action time included in the Anchor_BS_switch IE. If the value of the terminal is "10", the terminal cancels a high-speed switching operation and should maintain the communication with the existing base station.

However, the above-mentioned action code includes a value of "11" as a reserved region so as to be used afterward. Accordingly, a value of "11", which is included in the action code of the Anchor_BS_switch IE as the reserved region, is used in the exemplary embodiment of the present invention. That is, if "11" is used as the action code of the Anchor_BS_switch IE and is transmitted to the terminal when the base station should change the pFA, the terminal changes the pFA into a new pFA that is designated in the Anchor_BS_switch IE by the base station because the received value of the action code of the Anchor_BS_switch IE is "11".

The following Table 1 shows new formats of the Anchor_BS_switch IE, which are used in the exemplary embodiment of the present invention. Parameters, which have been used in the past, among the formats of the Anchor_BS_switch IE are already well known. Therefore, only newly added parameters, which are added to be used in the exemplary embodiment of the present invention, and parameters related thereto are shown herein.

TABLE 1

| Syntax | Size | Notes |
| --- | --- | --- |
| Anchor_BS_switch_IE( ){ | — | — |
| N_Anchor_BS_switch | 4 bits | The number of switching information of anchor base station |
| For(i=0;i<N_Anchor_BS_switch;i++){ | — | — |
| Action code | 2 bits | 0b00 - the terminal should perform high-speed switching to a target base station in a switch range that is included in a downlink channel descriptor message<br>0b01 - the terminal should perform high-speed switching to a target base station at an action time included in the Anchor_BS_switch IE<br>0b10 - the terminal should cancel high-speed switching and maintain communication with an existing base station<br>0b11 - the terminal should change an FA into a new FA within an action time defined in IE |
| IF(Action code==11){ | | |
| FA_status_bitmap | 16 bits | Designate a new pFA to be changed |
| }<br>}<br>} | | |

Referring to Table 1, when the value of the action code of the Anchor_BS_switch IE, is "11", a pFA change request appears from the base station to the terminal, and a new pFA to be changed is designated using an FA_status_bitmap parameter.

Since an existing MAP IE, is used as described above, it is possible to obtain an advantage of easily performing the pFA change according to the exemplary embodiment of the present invention.

Next, a method, which defines and uses a new MAP IE, for requesting the pFA change without using an existing MAP IE, will be described.

The following Table 2 shows formats of a MAP IE, which are newly defined to be used in the exemplary embodiment of the present invention. The MAP IE is a MAP IE where a base station requests a terminal to change the status of an FA, and is called an FA status change information element (hereinafter referred to as a "FA_status_change IE"). Herein, parameters, which are basically included to form the MAP IE, are not described, and only parameters used in the exemplary embodiment of the present invention and parameters related thereto are shown.

TABLE 2

| Syntax | Size | Notes |
|---|---|---|
| FA_status_change_IE( ){ | — | — |
| N_MS_changing_FAs | 4 bits | The number of terminals where FA status represented in IE is to be changed |
| For(i=0;i<N_MS_changing_FAs;i++){ | — | — |
| Reduced CID | 12 bits | LSB 12 bits of a basic CID of a terminal where FA status represented in IE is to be changed |
| Action code | 2 bits | 00b0 - the terminal should change a pFA into a new pFA defined in IE within an action time defined in IE<br>0b01 - the terminal should enable or disable each FA defined in IE within an action time defined in IE<br>0b10 - reserved region<br>0b11 - reserved region |
| IF(Action code==00 ‖ Action code==01){ | | |
| FA_status_bitmap | 16 bits | Designate a new pFA to be changed or an FA to be enabled or disabled |
| } | | |
| } | | |
| } | | |

Referring to Table 2, in a newly defined FA_status_change IE, a N_MS_change_FAs indicates the number of terminals where FA change should be performed, and includes reduced CIDs, action codes, and FA_status_bitmap information according to the action codes as many as the number defined in the N_MS_change_FAs.

The reduced CID indicates LSB 12 bits of a basic CID of a terminal where a pFA should be changed or FA status should be changed.

Two values are used as the action codes. When the action code is "00", a pFA change request appears from the base station to the terminal and a new pFA to be changed is designated using an FA_status_bitmap parameter. Meanwhile, when the action code is "01", a request for enabling or disabling an operation of a specific FA of the terminal appears from the base station and the FA, which should be enabled or disabled, is designated using an FA_status_bitmap parameter.

Figure 6:
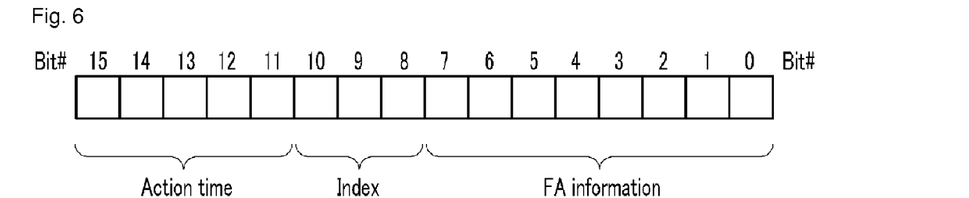
FIG. 6 is a view showing a bitmap of an FA_status_bitmap parameter included in a MAP IE in the method of changing a pFA according to the exemplary embodiment of the present invention.

Meanwhile, a pFA or an FA that should be changed by the terminal, or an FA of which status is changed to be enabled or disabled are defined by the FA_status_bitmap parameter, and each bit map of the FA_status_bitmap parameter is shown in FIG. 6.

Referring to FIG. 6, the FA_status_bitmap is composed of 16 bits in total. When LSB is set to Bit#0 and MSB is set to Bit#15, the contents of each bit will be described below. Herein, the size of the FA_status_bitmap is exemplified as 16 bits in order to show an example in the exemplary embodiment of the present invention, and may be changed.

o Bit#15 to Bit#11 (5 bits) indicates an action time. Herein, when the action code is "00", the action time is time required after the terminal receives the FA_status_change IE until an existing pFA is changed into a new pFA represented by an FA_status_bitmap. When the action code is "01", the action time is time required after the terminal receives the FA_status_change IE until the status of an FA represented by an FA_status_bitmap is changed.

o Bit#10 to Bit#8 (3 bits) designates a new pFA or an FA of which status is to be changed. The 3 bits substantially have an index value that represents one of 8 bits of Bit#7 to Bit#0. For example, a fact that values of Bit#10 to Bit#8 are "1" represents that an FA corresponding to Bit#1 as an index designating Bit#1 becomes a new pFA or an FA of which status is to be changed. Whether the FA becomes a new pFA or an FA of which status is to be changed is decided according to the above-mentioned action code.

o Bit#7 to Bit#0 (8 bits) indicates a bit map mapped to BSIDs of all of FAs, which are used by the terminal and the base station. Bits corresponding to all of the FAs, which are used as a pFA and an sFA by the terminal and the base station, are set to "1". Herein, the BSID functions as an identifier that is shared by the terminal and the base station in order to distinguish each FA. Since the BSID is already well known, the detailed description thereof will be omitted. In conclusion, all of the FAs used by the terminals are matched to Bit#7 to Bit#0. A bit corresponding to each of the FAs, which are used as a pFA and an sFA, is set to "1" and the others are set to "0". Therefore, o Bit#7 to Bit#0 (8 bits) is an FA related bit map to find out which FA is used.

A method of generating the bit map will be described below.

The values of the BSIDs of all of the FAs, which are used by the terminal and the base station, are sorted in ascending order. Further, the used BSIDs are mapped to Bit#0 to Bit#7 of the bit map in such a manner that the smallest BSID value is mapped to Bit#0 of the bit map on the basis of the sorted BSID values. For example, if the terminal uses three FAs, Bit#0, Bit#1, and Bit#2 are matched. That is, an FA having the smallest BSID value is matched to Bit#0, an FA having the largest BSID value is matched to Bit#2, and an FA having a middle BSID value is matched to Bit#1. As described above, among the bits of the bit map that are matched to the BSIDs, values of bits corresponding to all FAs, which are currently used to communicate with the base station as a pFA and an sFA by the terminal, are set to "1", and a value of the other is set to "0". In the example, if the FA having the smallest BSID value and the FA having the largest BSID value of the three FAs are used as a pFA and an sFA, respectively, the bit map is "00000101" when being represented from Bit#7.

Meanwhile, since it has been described above that Bit#10 to Bit#8 have index values, the index value should be an index value representing a bit, which is set to "1", of the bits of Bit#7 to Bit#0. In the example, if the bit map of Bit#7 to Bit#0 is represented by "0000101", and an FA corresponding to Bit#0 operates as a pFA, and an FA corresponding to Bit#2 operates as an sFA, the index values of Bit#10 to Bit#8 should be "0" or "2". If the base station and the terminal request the pFA change according to the exemplary embodiment of the present invention, the index value should represent not the current pFA but an FA. For this reason, the index value should be "2". Accordingly, if the terminal receives an FA_status_change IE from the base station, an action code included in the FA_status_change IE is "00", values corresponding to Bit#10 to Bit#0 of the FA_status_bitmap are "01000000101", the terminal determines the FA_status_change IE as a request for changing an FA, which corresponds to Bit#2 currently operating as an sFA, into a pFA, and may then perform a corresponding operation. Further, in this case, a new sFA becomes an FA corresponding to Bit#0.

When an initial access where the terminal has access to the base station to communicate with the base station is completed, a bit map for mapping FAs to Bit#7 to Bit#0 as described above is initially generated. In this case, the base station and the terminal confirm FA used by themselves, generate the bit maps according to the above-mentioned method of generating the bit map, and store the bit maps. The contents of the bit maps are the same. After that, when receiving the changed bit map from the base station through the MAP IE, the terminal updates the bit map stored therein by using the contents of the bit map received through the MAP IE. Meanwhile, since the initial access between the terminal and the base station has been already well known, the detailed description thereof will be omitted.

Figure 7:
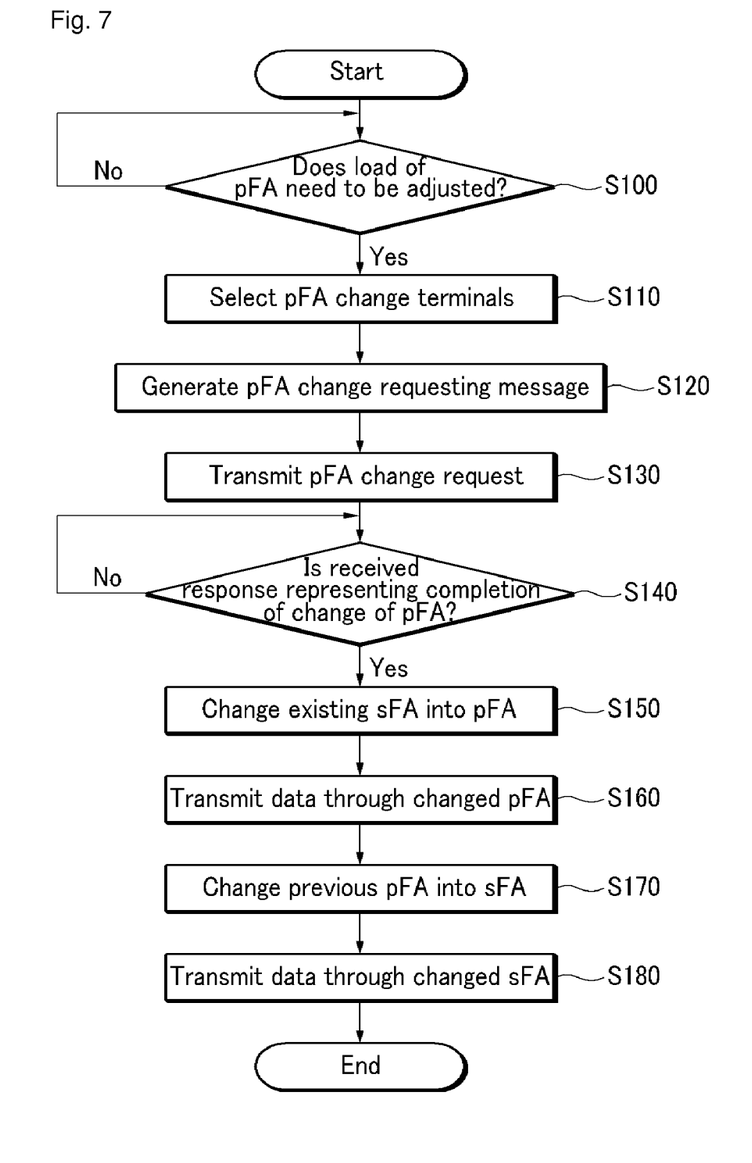
FIG. 7 is a flowchart illustrating a method of changing a pFA in a base station according to an exemplary embodiment of the present invention.

FIG. 7 is a flowchart illustrating a method of changing a pFA in a base station according to an exemplary embodiment of the present invention.

Referring to FIGS. 4 to 7, the base station 100 communicates with the terminal 200 through the FA#1 210 of the terminal 200 while using the FA#1 110 as a pFA, and communicates with the terminal 200 through the FA#2 220 of the terminal 200 while using the FA#2 120 as an sFA. In this case, the base station has already generated and had a bit map corresponding to the FA#1 110 and the FA#2 120 that communicate with the terminal 200. Referring to the above-mentioned example, the bit map is "00000101". That is, the FA#1 110 used as a pFA is matched to Bit#0, and the FA#2 120 used as an sFA is matched to Bit#2.

In this status, when an excess load is applied to the FA#1 110 used as the pFA of the base station 100 and it is thus determined the load needs to be adjusted (S100), the base station 100 selects terminals from terminals that communicate with the FA#1 110 through the pFA, as many as the number of terminals required for the load adjustment (S110). It is assumed that the terminal 110 shown in FIG. 4 is included in the terminals selected in step S110.

Next, the base station 100 changes the FA#1 110, which communicates with the terminal 200 selected in step S110 through the pFA, into an sFA, and changes the FA#2 120 used as an existing sFA into a pFA, thereby generating a MAP IE for requesting the terminal 200 to change the pFA in order to adjust the load (S120). In this case, the generated MAP IE is any one of the Anchor_BS_switch IE, which is an existing MAP IE used as described with reference to Table 1, and the FA_status_change IE, which is a MAP IE newly defined as described with reference to Table 2. All of the MAP IEs are set to a value where the action code requests the pFA change, and an FA_status_bitmap that includes an index representing a pFA to be changed may be set and generated. Referring to the example, the base station 100 generates an MAP IE so that Bit#10 to Bit#0 excluding an action time as the FA_status_bitmap are "01000000101".

Meanwhile, the number information of terminals selected in step S110 is set as an N_MS_changing_FAs parameter of the generated MAP IE, and the information about the terminals is recorded in the reduced CID.

After that, the base station 100 transmits the generated MAP IE, that is, an Anchor_BS_switch or an FA_status_bitmap to the terminal 100 through the MAP (S130). In this case, since the corresponding MAP IE is broadcasted to the terminals through the MAP, all of the terminals belonging to the base station 100 can use the MAP IE through the MAP. However, all of the terminals, which have received the MAP IE, do not change the status of the FA, and the only terminals, which are designated by the reduced CID included in the MAP IE, change the status of the FA. One of the terminals is the terminal 200.

Further, the base station 100 transmits the MAP IE through the FA#1 110 used as a pFA, and the terminal 200 also receives the MAP IE through the FA#1 210 used as a pFA.

Then, since the base station 100 transmits a pFA change request to the terminal 100, the base station waits for a response, which represents the completion of the change of a pFA, to be received from the terminal 100 (S140). When the response, which represents the completion of the change of a pFA, is received from the terminal 200, the FA#2 120 used as the sFA is changed into the pFA in the base station 100 as shown in FIG. 5 (S150). In this case, the response from the terminal 200 is transmitted from the FA#2 220 that is newly designated as a pFA in the terminal 200.

If the FA#2 120 of the base station 100 and the FA#2 220 of the terminal 200 are changed from an sFA into a pFA as described above, each of the FA#2 120 and the FA#2 220 operates as a pFA and performs communication such as data transmission (S160).

Next, since the FA#2 120 is completely changed into the pFA in the base station 100, the FA#1 110 having been a pFA in the past is set to an sFA (S170) and the communication such as data transmission is performed with an FA#1 210 used as a newly changed sFA even in the terminal 200 (S180).

As described above, the base station 100 transmits a MAP IE, which is used to adjust the load of the pFA, to the terminal 200, and the terminal 200 responds to this, so that the pFA can be changed on the side of the base station 100.

Figure 8:
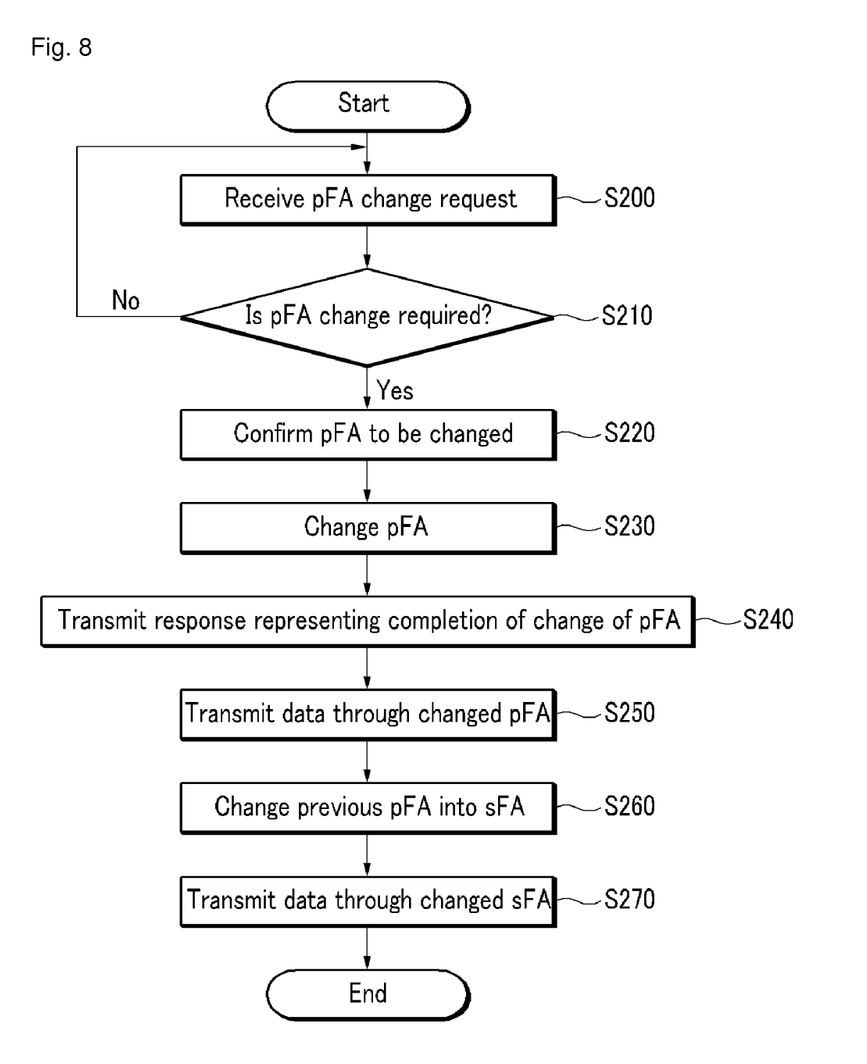
FIG. 8 is a flowchart illustrating a method of changing a pFA in a terminal according to an exemplary embodiment of the present invention.

FIG. 8 is a flowchart illustrating a method of changing a pFA in a terminal according to an exemplary embodiment of the present invention.

Referring to FIGS. 4 to 8, first, as shown in FIG. 7, the terminal 200 receives the MAP IE, which requests the pFA change, from the base station 100 (S200).

The terminal 200 confirms a MAP IE, which is to be performed by itself, through the reduced CID included in the MAP IE, and confirms a pFA change request through the action code included in the MAP IE (S210).

If the received MAP IE is an Anchor_BS_switch IE and a value of the action code is "11" or if the received MAP IE is an FA_status_change IE and a value of the action code is "00", the pFA change is requested from the base station 100. Therefore, the terminal 200 confirms the pFA to be changed (S220). Since the pFA to be changed is set in the FA_status_bitmap parameter included in the MAP IE, the terminal 200 can confirm the pFA to be changed through the FA_status_bitmap parameter. Referring to an example shown in FIG. 7, as a value that is used to change the FA#2 120 from the sFA to the pFA in the base station 100, "01000000101" is set as the FA_status_bitmap parameter and the base station 100 transmits the value. Therefore, the terminal 200 can confirm that the FA#2 120 of the base station 100 is an FA to be changed into a new pFA, through the index value "2" represented by the Bit#10 to Bit#8 of the FA_status_bitmap parameter. Accordingly, like in the base station 100, the FA#2 220 used as the existing sFA is changed into a pFA and the FA#1 210 used as the existing pFA is changed into an sFA in the terminal 200.

Therefore, after an existing FA#1 110 is changed into the FA#2 120 as the pFA of the base station 100 with which the FA#2 220 used as a new pFA of the terminal 200 communicates (S230), the terminal transmits a response representing the completion of the change of the pFA to the FA#2 120 used as a new pFA of the base station 100 through the FA#2 220 (S240). In this way, the pFA is completely changed between the terminal 200 and the base station 100. Therefore, the FA#2 220 used as the new pFA of the terminal 200 performs communication such as data transmission with the FA#2 120 used as the new pFA of the base station 100 (S250).

Then, the pFA is completely changed with the base station 100, and the terminal 200 maintains the communication through the pFA. Therefore, after an existing FA#2 120 is changed into the FA#1 110 as the sFA of the base station 100 with which the FA#1 210 used as a new sFA of the terminal communicates (S260), the terminal performs communication such as data transmission to the FA#1 110 used as an sFA of the base station 100 through the FA#1 210 thereof (S270).

In this way, the terminal 200 receives a MAP IE, which is used to adjust a load of the pFA, from the base station 100, changes the pFA, and responds to the base station 100, so that the pFA can be changed on the side of the base station 100.

Hereinafter, a method of changing a pFA according to an exemplary embodiment of the present invention will be described with reference to FIGS. 4 to 9.

Referring to FIG. 4, the base station 100 and the terminal 200 communicate with each other through two FAs as described above. Among two FAs used for communication, each of the FA#1 110 of the base station 100 and the FA#1 210 of the terminal 200 is a pFA, and each of the FA#2 120 of the base station 100 and the FA#2 220 of the terminal 200 is an sFA.

Figure 9:
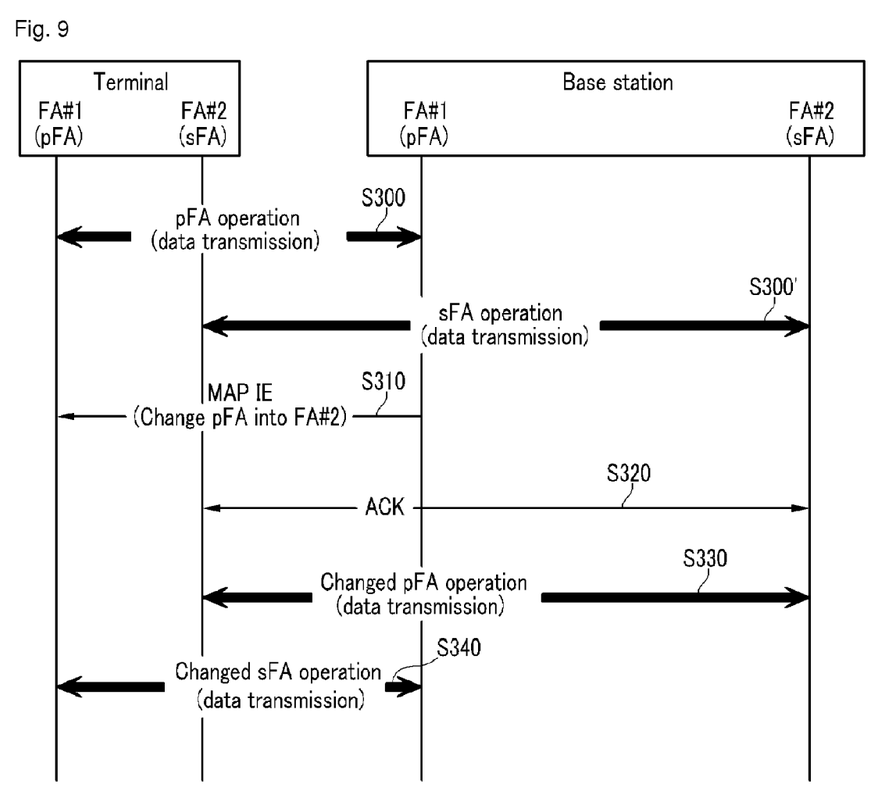
FIG. 9 is a flowchart illustrating a method of changing a pFA according to an exemplary embodiment of the present invention.

Therefore, the base station 100 and the terminal 200 communicate with each other, that is, transmit control signals and data therebetween through the FA#1 110 and the FA#1 210 that operate as pFAs, as shown in FIG. 9 (S300). Further, the base station 100 and the terminal 200 communicate with each other, that is, transmit data therebetween through the FA#2 120 and the FA#2 220 that operate as sFAs (S300').

In this status, the base station 100 transmits a MAP IE, which requests the change of the pFA to the FA#2 120, to the terminal 200 through the FA#1 110 in order to adjust the load of the FA#1 110 used as a pFA (S310). In this case, the Anchor_BS_switch IE described with reference to Table 1 or the FA_status_change IE described with reference to Table 2 may be used as the MAP IE.

The terminal 200 having received the MAP IE confirms that the pFA of the base station 100 is changed into the FA#2 120 used as a new pFA defined in the MAP IE, and then changes the FA#2 220 used as the existing sFA thereof into a new pFA. After that, a response ACK representing the completion of the change of the pFA is transmitted to the FA#2 120, which is used as a new pFA of the base station 100, through the FA#2 220 used as a new pFA of the terminal (S320). Subsequently, the FA#2 220 used as a new pFA of the terminal 200 newly communicates with, that is, transmits control signals and data to the FA#2 120 that operates as a new pFA of the base station 100 (S330).

Then, the FA#1 110 used as the existing pFA of the terminal 200 is changed into the sFA of the base station 100. Accordingly, the FA#1 210 having been used as the existing pFA of the terminal is changed into a new sFA. After that, the terminal newly communicates with, that is, transmits data to the FA#1 110, which operates as a new sFA of the base station 100, through the FA#1 210 used as the new sFA thereof (S340).

As described above, the base station 100 transmits a MAP IE, which is used to adjust the load of the pFA, to the terminal 200. Then, the base station changes the pFA of the base station 100 into the pFA defined in the MAP IE received by the terminal 200, and responds to this, so that the pFA can be changed on the side of the base station 100.

Meanwhile, in the above description, the action code, which is included in the MAP IE received from the base station 100 by the terminal 200, is confirmed that the pFA change is requested, and the base station 100 and the terminal 200 change the pFA and the sFA. However, according to the exemplary embodiment of the present invention, it is possible to change the status of the FA designated by the base station 100. For example, if the action code included in the MAP IE that is received from the base station 100 by the terminal 200, particularly as described with reference to Table 2, the MAP IE that is newly defined to be used in the exemplary embodiment of the present invention, that is, the action code included in FA_status_change IE has a value of "01" that requests the change of the status of the FA, the FA of which status is changed through the index of Bit#10 to Bit#8 of the FA_status_bitmap is confirmed and the status of the corresponding FA can be changed. That is, if the corresponding FA is enabled, the operation thereof is disabled. If the corresponding FA is disabled, the operation thereof is enabled. A detailed process for performing the above operation can be easily understood with reference to the process for changing the pFA that has been described with reference to FIGS. 4 to 9.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of changing a frequency assignment (FA) status in a base station of a broadband wireless access system, the method comprising:
   determining an FA of which status is to be changed;
   transmitting a status change request of the decided FA to a terminal; and
   receiving a completion response of the status change request of the FA from the terminal,
   wherein the determining of the FA includes:
   determining whether a load of a primary FA, among a plurality of FAs communicating with the terminal, for transmitting main control signals and data traffic needs to be adjusted by the base station; and
   when the load of the primary FA needs to be adjusted, determining a secondary FA of which status is to be changed into the state of the primary FA,
   wherein the secondary FA is one of the plurality of FAs communicating with the terminal other than the primary FA.

2. The method of claim 1, wherein the transmitting of the status change request includes:
   selecting terminals, of which statuses are changed, among terminals that communicate with the primary and secondary FAs;
   generating messages for requesting the selected terminals to change the status of the primary FA; and
   transmitting the generated messages to the selected terminals.

3. The method of claim 2, further comprising
   after the receiving of the completion response, communicating with the terminals through the FAs of which statuses are completely changed,
   wherein the communicating with the terminals includes:
   changing the status of the secondary FA, which is decided in the deciding of the secondary FA, into the status of the primary FA;
   transmitting control signals and data traffic to the terminals through the primary FA of which status is changed;
   changing the status of the existing primary FA, which has communicated with the terminals, into the state of the secondary FA; and
   transmitting data traffic to the terminals through the secondary FA of which status is changed.

4. The method of claim 1, wherein the broadband wireless access system is a frequency overlay communication system for providing a frequency overlay function that makes the base stations communicate with the terminals through the plurality of FAs.

5. The method of claim 1, wherein the message is a MAP that is transmitted to the terminal by the base station, and is an information element (hereinafter, referred to as a "MAP IE") where the information about the status change is included in the MAP and transmitted.

6. The method of claim 5, wherein the MAP IE is an anchor base station switch information element that is a MAP IE included in a UL MAP transmitted to the terminal by the base station in order to perform the high-speed switching of the base station, or a newly defined MAP IE that is used to request the change of the status of the FA.

7. The method of claim 6, wherein the information about the status change included in the MAP IE includes:
   an action code representing a request that makes a terminal receiving the MAP IE change the status of the FA; and
   an FA change bit map representing an FA of which status is changed by the terminal.

8. The method of claim 7, wherein:
   the FA change bit map includes:
   an action time field representing time required until the status of the FA is changed; an index field representing an FA of which status is to be changed; and
   an FA related bit map that represents all of the FAs used by the base stations and FAs communicating with the terminals.

9. The method of claim 8, wherein a value of the index field is a value that represents one of bits of the FA related bit map, and an FA corresponding to the bit represented by the value of the index field is an FA of which status should be changed.

10. The method of claim 2, wherein the messages transmitted to the selected terminals are transmitted to the primary FAs of the selected terminals through the primary FA of the base station.

11. The method of claim 10, wherein responses to the messages transmitted to the primary FAs of the selected terminals are received through the secondary FAs of the base stations of which statuses are changed.

12. The method of claim 1, wherein the status change request of the FA enables or disables the decided FA.

13. A method of changing a Frequency Assignment FA status in a terminal of a broadband wireless access system, the method comprising:
   receiving a status change request of an FA from a base station through a primary FA, among a plurality of FAs communicating with the terminal, the primary FA transmitting main control signals and data traffic;
   confirming an FA of which status is to be changed in the base station;
   changing the status of the FA; and
   transmitting a response, which represents the completion of the change of the FA, to the base station,
   wherein in the confirming of the FA, the primary FA of the terminal confirms the change of the status of the primary FA of the base station through the status change request of the FA, and confirms the status of a secondary FA of the base station which status is changed into the status of the primary FA,
   wherein the secondary FA is one of the plurality of FAs communicating with the terminal other than the primary FA.

14. The method of claim 13, wherein in the receiving of the status change request, the status change request of the FA is received through a MAP transmitted from the base station, and information about an FA of which status is changed is included in an information element that is included in the MAP and transmitted.

15. The method of claim 13, wherein in the changing of the status of the FA, the primary FA of the terminal changes the status of the secondary FA, of which status is to be changed into the status of the primary FA in the confirming of the FA, of the base station into the status of the primary FA of the base station, and in the transmitting of the response, a response representing the completion of the change of the status of the FA is transmitted through the secondary FA of the base station.

16. The method of claim 13, further comprising:
   after the transmitting of the response, communicating with the FA, of which status is completely changed, of the base station,
   wherein in the communicating with the FA, the primary FA of the terminal transmits control signals and data traffic to the secondary FA of the base station.

17. The method of claim 16, further comprising:
after the communicating with the FA, changing the status of the primary FA of the base station into the status of the secondary FA of the base station by the secondary FAs of the terminals (herein, the secondary FAs of the terminals are the rest of the FAs except for the primary FA), and transmitting data traffic to the secondary FA of which status is changed.

18. The method of claim 13, wherein:
the change of the status of the FA is the status change that enables or disables the FA.

19. The method of claim 13, wherein the information about an FA comprises:
an action code representing a request that makes a terminal receiving a MAP IE change the status of the FA; and
an FA change bit map representing an FA of which status is changed by the terminal,
wherein the FA change bit map includes:
an action time field representing time required until the status of the FA is changed; an index field representing an FA of which status is to be changed; and
an FA related bit map that represents all of the FAs used by the base stations and FAs communicating with the terminals.

* * * * *